US007923621B2

(12) United States Patent

Shiraishi et al.

(10) Patent No.: US 7,923,621 B2

(45) Date of Patent: Apr. 12, 2011

(54) TEMPO ANALYSIS DEVICE AND TEMPO ANALYSIS METHOD

(75) Inventors: Goro Shiraishi, Tokyo (JP); Chie Sekine, Saitama (JP); Kumiko Masuda, Kanagawa (JP); Kuniharu Mori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/551,403

(22) PCT Filed: Mar. 9, 2004

(86) PCT No.: PCT/JP2004/003010

§ 371 (c)(1), (2), (4) Date: Sep. 29, 2005

(87) PCT Pub. No.: WO2004/088631

PCT Pub. Date: Oct. 14, 2004

(65) Prior Publication Data

US 2006/0185501 A1 Aug. 24, 2006

(30) Foreign Application Priority Data

Mar. 31, 2003 (JP) ................................ 2003-094100

(51) Int. Cl.

*G10H 1/40* (2006.01)

*G06F 17/00* (2006.01)

(52) U.S. Cl. ........................................... 84/612; 700/94

(58) Field of Classification Search .................... 84/612, 84/636, 652; 700/94

See application file for complete search history.

(56) References Cited

U.S. PATENT DOCUMENTS

| | | | | |
|---|---|---|---|---|
| 5,614,687 | A * | 3/1997 | Yamada et al. | 84/662 |
| 6,140,565 | A * | 10/2000 | Yamauchi et al. | 84/600 |
| 6,518,492 | B2 * | 2/2003 | Herberger et al. | 84/636 |
| 2004/0027369 | A1 * | 2/2004 | Kellock et al. | 345/716 |

FOREIGN PATENT DOCUMENTS

| | | | |
|---|---|---|---|
| JP | 8-76777 | A | 3/1996 |
| JP | 10-319957 | A | 12/1998 |
| JP | 2000-267654 | A | 9/2000 |
| JP | 2000-276137 | A | 10/2000 |
| JP | 2000-311251 | A | 11/2000 |
| JP | 2002-207482 | A | 7/2002 |

* cited by examiner

*Primary Examiner* — Elvin G Enad

*Assistant Examiner* — Andrew R Millikin

(74) *Attorney, Agent, or Firm* — Wolf, Greenfield & Sacks, P.C.

(57) ABSTRACT

A tempo analyzer to analyze the tempo of sound such as a musical composition or the like is provided in which a controller (9) takes, based on level information on a sound signal from an analysis data extraction unit (62), a frame which is a predetermined unit-time interval as a unit of process, detects positions of peaks of the level of the sound signal (apex of the change in level) higher than a predetermined level to find a time interval (peak-to-peak interval) between the peak positions in the frame, and determines a peak-to-peak time interval having occurred frequently as a tempo.

12 Claims, 14 Drawing Sheets

TEMPO ANALYSIS DEVICE AND TEMPO ANALYSIS METHOD

TECHNICAL FIELD

The present invention relates to a tempo analysis apparatus and method, for extracting, from a sound signal in a musical computation and the like, a tempo that is a relative speed at which music is played.

This application claims the priority of the Japanese Patent Application No. 2003-094100 filed on Mar. 31, 2003, the entirety of which is incorporated by reference herein.

BACKGROUND ART

Conventionally, audio data included in a piece of music is analyzed to automatically extract the tempo of the music for use in preparing a written composition or adapting a musical composition. The Japanese Patent Application Laid Open No. 2002-116754 discloses a technique of extracting a tempo from such a written composition.

The technique disclosed in the above patent document is to acquire audio data in a music composition as time-series data and calculate the autocorrelation of the audio data to detect peak positions in the audio data and acquire candidates for a tempo, while analyzing the beat structure of the music composition on the basis of the peak positions in the autocorrelation pattern and levels of the peaks to estimate a most appropriate tempo on the basis of the tempo candidates and the result of beat structure analysis.

Using the technique disclosed in the above patent document, even any person having no pure knowledge of the music can extract an intended musical tempo relatively simple and accurately.

Note here that there has recently been proposed to detect the tempo of a musical composition to be reproduced and provide information corresponding to the detected tempo or make various kinds of control correspondingly to such a detected tempo in an in-vehicle audio system (Car Stereo) or home audio system.

With the technique disclosed in the aforementioned patent document, vast complicated computational operation is required for calculation of the autocorrelation of audio data and analysis of beat structure, and thus the load to the CPU (central processing unit) making such an operation is large.

On this account, the technique disclosed in the patent document is not suitable for employment in a relatively small-scale in-vehicle or home audio system as the case may be. Also, in case the technique in question is adopted, it becomes necessary to use a CPU having a high processing power and a memory having a larger capacity, which will lead to an expensive audio system.

DISCLOSURE OF THE INVENTION

Accordingly, the present invention has an object to overcome the above-mentioned drawbacks of the related art by providing an improved and novel tempo analyzing apparatus and method.

The present invention has another object to provide a tempo analyzing apparatus and method, capable of detecting the tempo of sound such as a musical composition simply and accurately without application of any large load to the CPU and increase of costs.

The above object can be attained by providing a tempo analyzing apparatus including, according to the present invention, a peak detecting means for detecting positions of a plurality of ones, higher than a predetermined threshold, of peaks of change in level of an input sound signal; a time interval detecting means for detecting a time interval between the peak positions detected by the peak detecting means in a predetermined unit-time interval; and an identifying means for identifying the tempo of sound to be reproduced with the sound signal on the basis of a frequently occurring one of the time intervals detected by the time interval detecting means.

In the above tempo analyzing apparatus according to the present invention, the peak detecting means sequentially detects positions of peaks of the level of the sound signal (apex of the change in level), higher than the predetermined threshold and just about to shift from the ascent to descent. Then, a time interval (peak-to-peak interval) between the position of at least one predetermined reference one of the plurality of peak positions detected in the predetermined unit-time interval and that of the other peak is detected by the time interval detecting means as a rule. Thereafter, the identifying means detects the frequently occurring time interval on the basis of the result of detection from the time interval detecting means and identifies the tempo of sound such as a musical composition to be reproduced with the sound signal to be processed on the basis of the detected time interval. Thus, the tempo of sound such as a musical composition can be identified simply and accurately without having to make any complicated computational operation such as calculation of an autocorrelation.

More specifically, the identifying means included in the tempo analyzing apparatus accumulates the frequency of occurrence of the time interval between the positions of peaks detected in a plurality of unit-time intervals and identifies the tempo of the sound to be reproduced on the basis of the accumulated frequency of occurrence.

The above tempo analyzing apparatus according to the present invention further includes a frequency band dividing means for dividing an input signal into a plurality of frequency bands. In this tempo analyzing apparatus, the peak detecting means detects the peak positions for each of at least one or more ones of the plurality of frequency bands divided by the frequency band dividing means, the time interval detecting means detects a time interval between peak positions detected for each of at least one or more frequency bands by the peak detecting means, and the identifying means identifies the tempo of sound to be reproduced on the basis of the frequently occurring one of the time intervals detected for each of at least one or more frequency bands.

The above tempo analyzing apparatus according to the present invention further includes a volume calculating means for calculating the volume of a sound signal, and a threshold setting means for setting the threshold used to detect a peak position with reference to the volume calculated by the volume calculating means.

In this tempo analyzing means, there may be provided a volume calculating means for calculating the volumes of sound signals of frequencies included in at least one or mode of the plurality of frequency bands divided by the frequency band dividing means, and a threshold setting means for setting the threshold used to detect a peak position with reference to the volume calculated by the volume calculating means.

In the tempo analyzing apparatus according to the present invention, there may further be provided a frequency band extracting means for extracting a sound signal of a frequency in a predetermined frequency band from an input sound signal and the peak detecting means may be adapted to detect a peak position of a sound signal extracted by the frequency band extracting means. In this tempo analyzing apparatus, there are provided a volume calculating means for calculating the volume of the sound signal extracted by the frequency band extracting means, and a threshold setting means for setting a threshold used for to detect a peak position with reference to the volume calculated by the volume calculating means.

The above tempo analyzing apparatus according to the present invention further includes an image display device, a storage means for storing video data on a plurality of images displayable on the image display element, and a display controlling means for selecting and reading video data from the storage means and displaying an image corresponding to the read video data on the image display device.

The display controlling means in the above tempo analyzing apparatus controls at least one of the size, moving speed and moving pattern of an image to be displayed on the image display device which displays an image corresponding to video data read from the storage means.

The display controlling means may be adapted to select and read video data from the storage means on the basis of the tempo identified by the identifying means and sound volume calculated by the volume calculating means.

Also, the above object can be attained by providing a tempo analyzing method including, according to the present invention, the steps of detecting positions of a plurality of ones, higher than a predetermined threshold, of peaks of change in level of an input sound signal; detecting a time interval between the detected peak positions in a predetermined unit-time interval; and identifying the tempo of sound to be reproduced with the sound signal on the basis of one, having occurred at a high frequency, of the detected time intervals. For the identification of the tempo, the frequency of occurrence of the time interval between the peak positions detected in a plurality of the unit-time intervals is accumulated. The tempo of the sound to be reproduced is identified on the basis of the frequency of occurrence thus accumulated.

Further in the above tempo analyzing method according to the present invention, the input sound signal is divided into a plurality of frequency bands, the peak position in each of at least one or more of the divided frequency bands is detected, the time interval of the peak position in each of the at least one or more frequency bands is detected, and the tempo of the sound to be reproduced is identified on the basis of the one, having occurred at a high, of the time intervals detected in each of at least one or more frequency bands.

Also in the above tempo analyzing method according to the present invention, the sound signal of a frequency included in a predetermined frequency band may be extracted from the input sound signal, and the peak position of the extracted sound signal be detected.

Further in the tempo analyzing method according to the present invention, the sound volume of the input sound signal is calculated, and a threshold for use to detect the peak position be set with reference to the calculated sound volume.

In the tempo analyzing method according to the present invention, video data is selectively read from a plurality of video data stored in a storage means on the basis of the identified tempo and an image corresponding to the read video data is displayed on an image display device. In this tempo analyzing method, the size, moving speed and moving pattern of the image to be displayed on the image display device are controlled on the basis of the identified tempo. Alternatively, a plurality of video data stored in the storage means is selectively read on the basis of the identified tempo and calculated sound volume.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The tempo analyzing apparatus and method according to the present invention will be described in detail below with reference to the accompanying drawings.

Note that in the following, a car stereo system (in-vehicle audio system) according to the present invention will be described by way of example.

Figure 1:
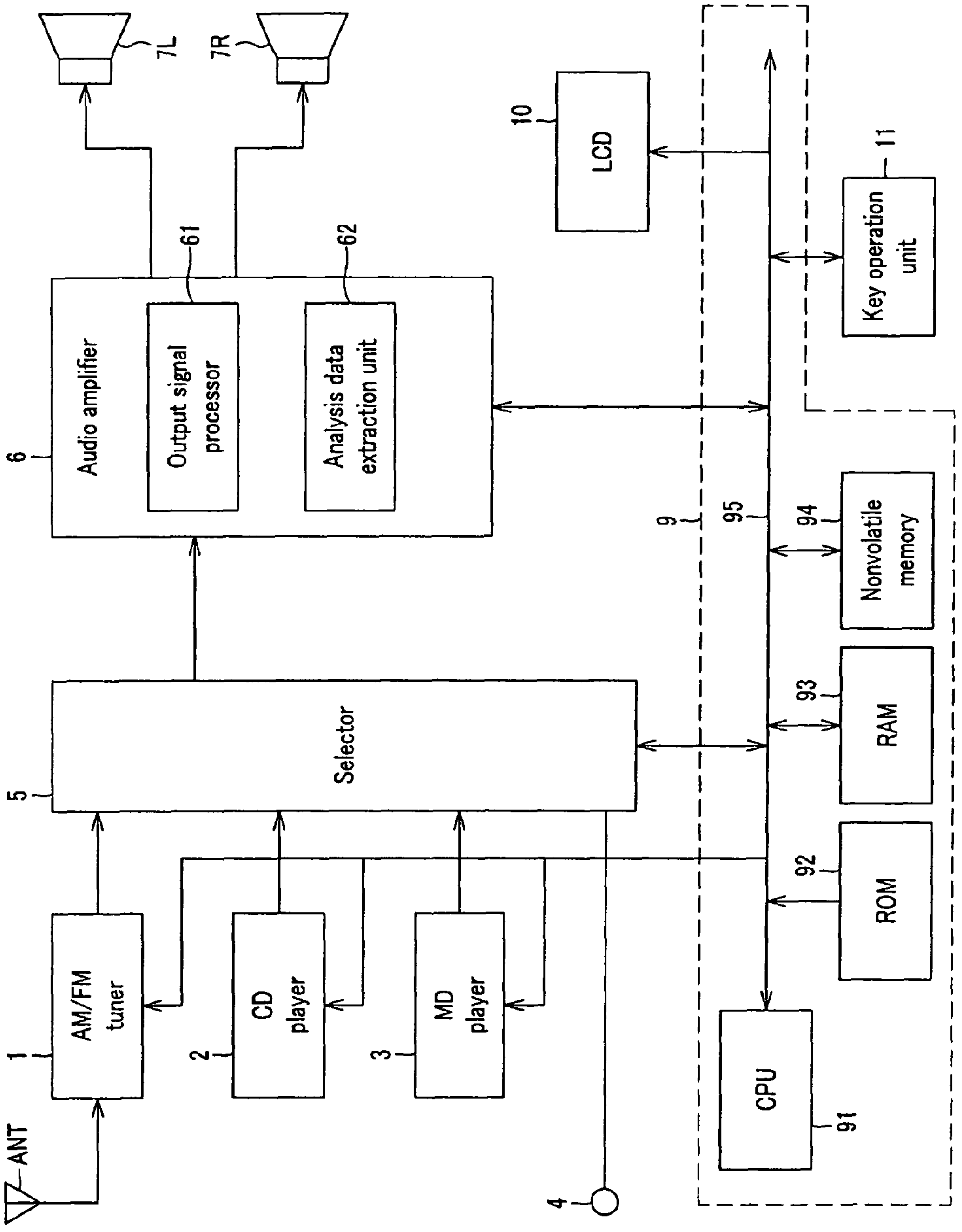
FIG. 1 is a block diagram of a car stereo system according to the present invention.

First, the car stereo system according to the present invention will be explained. As shown in FIG. 1, the car stereo system according to the present invention includes a radio broadcast receiving antenna ANT, AM/FM tuner 1, CD (compact disk) player 2, MD (Mini Disk) player 3, external connection terminal 4, input selector 5, audio amplifier 6, right and left speakers 7R and 7L, controller 9, LCD (liquid crystal display) 10, and a key operation unit 11.

As shown in FIG. 1, the controller 9 is a microcomputer including a CPU (central processing nit) 91, ROM (read-only memory) 82, RAM (random-access memory) 93 and a nonvolatile memory 94, connected to each other via a CPU bus 95, to control components of the car stereo system.

The ROM 92 is provided to store programs to be executed by the CPU 91 and necessary data for execution of such programs, video data, character font data, etc used for display. The RAM 93 is used mainly as a work area. The nonvolatile memory 94 is for example an EEPROM (electrically erasable and programmable ROM) or flash memory to store and hold data which has to be held even when the power supply to the car stereo system, such as various setting parameters.

Also, the controller 9 has the LCD 10 and key operation unit 11 connected thereto as shown in FIG. 1. The LCD 10 has a relatively large display screen capable of displaying the current status of the car stereo system, guidance for operating the car stereo system, etc. Also, in case the CLD 10 has an external device such as a GPS (global positioning system) or DVD (digital versatile disk) player connected thereto via the external input terminal, for example, it can display geographic information, moving-image information or the like under the control of the controller 9.

The key operation unit 11 is provided with various control keys, function keys, control dials, etc. It can be operated by the user, convert such an operation into an electric signal and supply the electric signal as a command to the controller 9. Thus, the controller 9 controls each component of the car stereo system in response to a command entered by the user.

As shown in FIG. 1, the AM/FM tuner 1, CD player 2, MD player 3 and external input terminal 4 in the car stereo system are source of sound signal (audio data). Based on a tuning control signal from the controller 9, the AM/FM tuner 1 selectively receives a desired broadcast channel from AM or FM radio broadcasts, demodulates the selected radio broadcast signal and supplies the demodulated sound signal to the selector 5.

The CD player 2 includes a spindle motor, optical head, etc. It rotates a CD set therein, irradiates laser light to the rotating CD, detects return light from the CD, and reads audio data recorded as a pit pattern which is a succession of tiny convexities and concavities formed in the CD. It converts the read audio data into an electric signal and demodulates it to form a read sound signal, and supplies the sound signal to the selector 5.

Similar to the CD player 2, the MD player 3 includes a spindle motor, optical head, etc. It rotates an MD set therein, irradiates laser light to the rotating MD, detects return light from the MD, reads audio data recorded as a magnetic change in the MD, and converts the audio data into an electric signal. Since the sound signal thus read is normally a compressed signal, it is decompressed to form a read sound signal, and this sound signal is supplied to the selector 5.

The external connection terminal 4 has an external device such as the GPS, DVD player or the like connected thereto as mentioned above, and it supplies sound signal from such an external device to the selector 5.

Then, the selector 5 is controlled by the controller 9 to select any one of the AM/FM tuner 1, CD player 2, MD player 3 and external connection terminal 4 for connection to the audio amplifier 6. Thus, a sound signal from a selected one of the AM/FM tuner 1, CD player 2, MD player 3 or external connection terminal 4 is supplied to the audio amplifier 6.

The audio amplifier 6 is composed mainly of an output signal processor 61 and analysis data extraction unit 62. Based on a control signal from the controller 9, the output signal processor 61 makes adjustment in volume, tone and the like of a sound signal going to be outputted to form a sound signal for delivery, and supplies the output sound signal to the speakers 7R and 7L.

Thus, sound corresponding to the sound signal from one of the four components 1 to 4 shown in FIG. 1 can be emitted from the speakers 7R and 7L.

On the other hand, the analysis data extraction unit 62 divides the sound signal supplied thereto into a plurality of frequency bands, and supplies information indicative of the level of sound signal in each of the frequency bands to the controller 9. The controller 9 detects a peak position of the sound signal on the basis of analysis data from the analysis data extraction unit 62, calculates a time interval between peak positions in a predetermined unit time, and identifies the tempo of the output sound on the basis of the result of calculation, which will be described in further detail later.

In this embodiment, the controller 9 selects, for example, data corresponding to the tempo identified as above from still-image data stored in the ROM 92 or nonvolatile memory 94 for display on the LCD 10. Also, the controller 9 displays an image such as a graphic or character, for example, over a still image for display on the LCD 10 in such a manner that it will move in response to the identified tempo.

In the car stereo system according to the present invention, the analysis data extraction unit 62 in the audio amplifier 6 and the controller 9 form together a tempo analysis block. The analysis data extraction unit 62 and controller 9 work collaboratively to identify the tempo of sound such as a musical composition to be reproduced for utilization.

That is, the tempo analysis block comprised of the analysis data extraction unit 62 and controller 9 is an application of the tempo analyzer according to the present invention, and the method used in the tempo analyzer is an application of the tempo analyzing method according to the present invention.

According to the present invention, the tempo of objective sound such as a musical composition to be reproduced is identified simply and accurately without having to perform any conventional complicated operations such as autocorrelation calculation and the like.

Next, the tempo analysis block installed in the car stereo system according to the present invention will be illustrated and explained.

Figure 2:
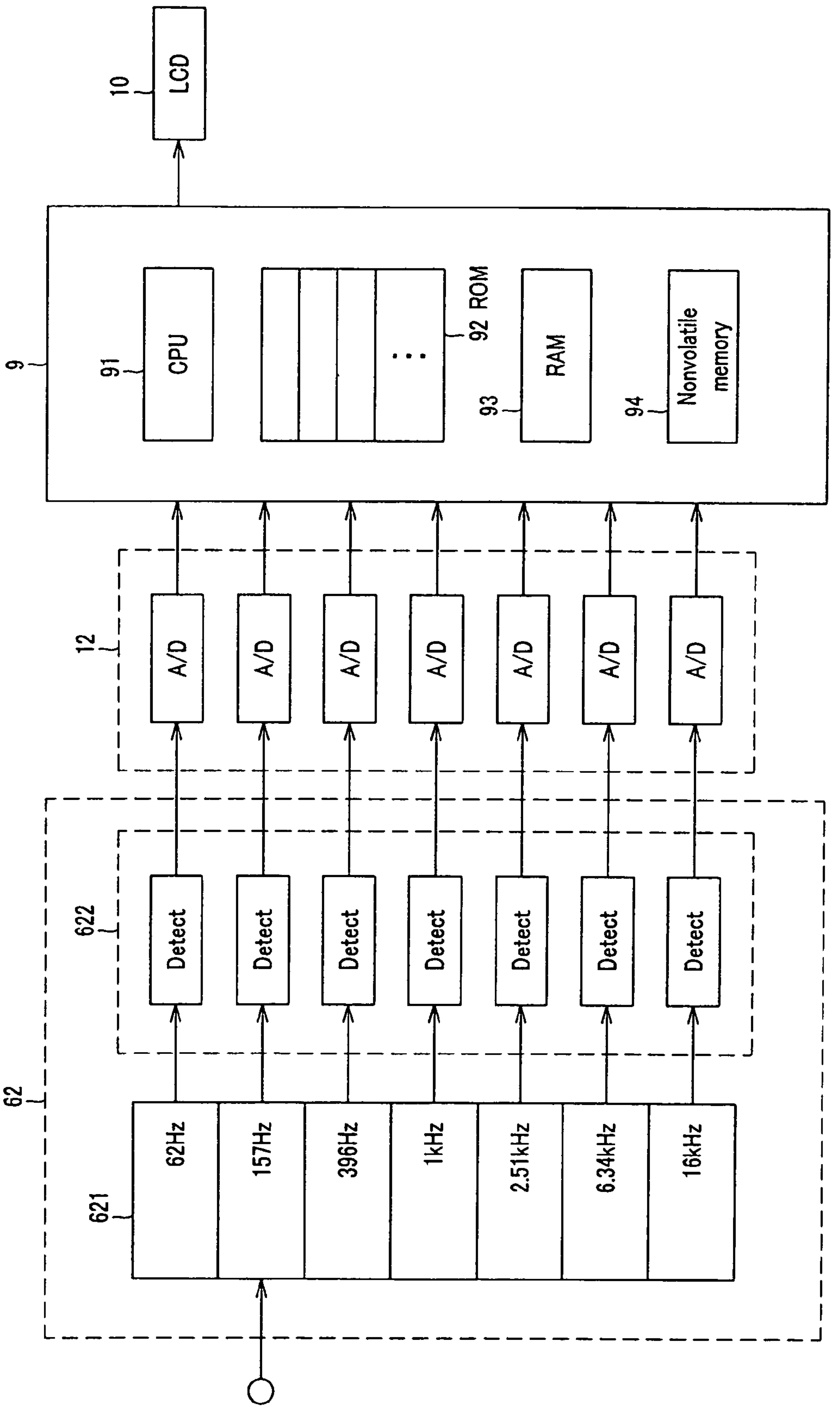
FIG. 2 is also a block diagram of a tempo analyzer installed in the car stereo system.

FIG. 2 schematically illustrates in the form of a block diagram the tempo analysis block installed in the car stereo system. As mentioned above, the tempo analyzer according to the present invention is formed from the analysis data extraction unit 62 provided in the audio amplifier 6 of the car stereo system and the controller 9.

As shown in FIG. 2, an A-D converter 12 is provided between the analysis data extraction unit 62 and controller 9. The A-D converter 12 converts information indicative of the level of an output sound signal (voltage, for example) from the analysis data extraction unit 62 into digital data in 1024 steps from 0 to 1023 for supply to the controller 9.

Although in this embodiment, the above A-D converter 12 is provided between the analysis data extraction unit 62 and controller 9 as shown in FIG. 2, it may be provided as a function of either the analysis data extraction unit 62 or the controller 9.

In this embodiment, the analysis data extraction unit 62 includes a frequency band divider 621 that divides a sound signal supplied thereto into a plurality of frequency bands, and a level detector 622 that detects the level of each signal having a frequency falling within each of the plurality of frequency bands and outputs it as level signal.

The frequency band divider 621 divides a sound signal into 7 frequency bands whose center frequencies are 62 Hz, 157 Hz, 396 Hz, 1 kHz, 2.51 kHz, 6.34 kHz and 16 kHz, respectively, as shown in FIG. 2 as well.

In the frequency divider 621, the sound signal of a frequency in each of the divided bands is supplied to the level detector 622 in which the level of each of them is detected, as shown in FIG. 2. Information indicative of the level of each sound signal of a frequency in each divided band, of which the level has been detected by the level detector 622, is supplied to the controller 9 via the A-D converter 12. Namely, the level waveform (sound level waveform) of the sound signal of a frequency in each of the divided frequency bands is supplied as digital data to the controller 9.

Note that the analysis data extraction unit 62 can be implemented by a general-purpose integrated circuit, for example, IC A633AB (ST Microelectronics). Also, the analysis data extraction unit 62 may be formed from a microcomputer to divide a sound signal into a plurality of frequency bands and detect a signal level by a software which is executed in the microcomputer.

The controller 9 uses the level (sound level waveform) of the sound signal of a frequency in each of the divided bands from the analysis data extraction unit 62 to identity the tempo of to-be-processed sound with simple operations including comparison and others. Based on the identified tempo, the controller 9 extracts video data forming a still image corresponding to the tempo from the still-image data prepared in the ROM 92, for example, for display on the display screen of the LCD 10.

At the same time, the controller 9 displays a predetermined graphic, character, etc. on the display screen of the LCD 10 while moving the graphic and character at a rate corresponding to the identified tempo.

Figure 3:
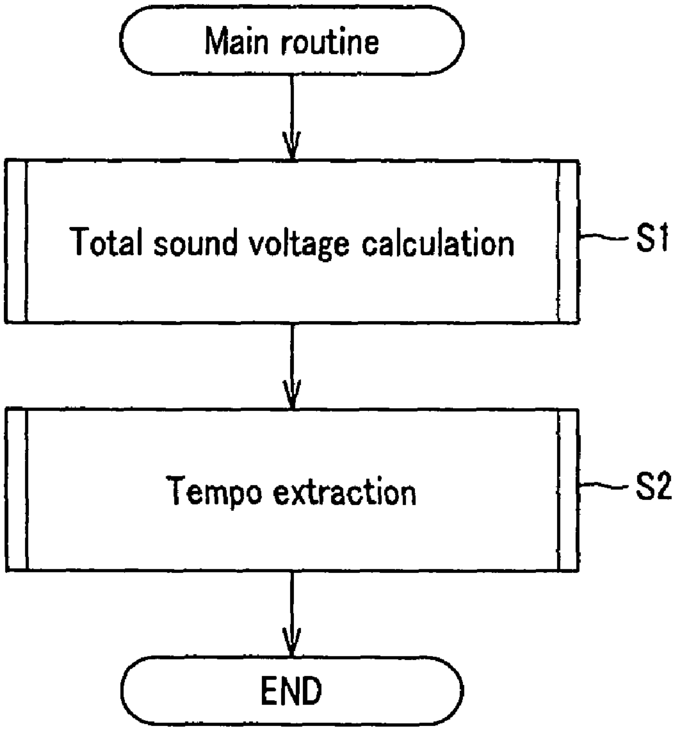
FIG. 3 shows a flow of operations made in the main routine in the controller.

Next, a routine to identify the tempo of sound to be reproduced with a sound signal which is to be subjected to a process effected as a function of the controller 9 as having been described above will be described in detail. FIG. 3 shows a flow of operations made in a main routine for identifying the tempo of sound to be reproduced with a sound signal which is to be subjected to a process done in the car stereo system according to the present invention.

In this car stereo system, the controller 9 calculates a finally identified tempo and the sound volume (total volume) of an input sound signal as a parameter for displaying video data (in step S1).

Then, the controller 9 makes operations for extraction and identification of the tempo of sound to be processed (in step S2). Video data to be displayed and content of the display are determined based on parameters (total sound volume and tempo) determined with the operations made in steps S1 and S2.

In the above car stereo system according to the present invention, the sound signal to be processed is divided into seven frequency bands and the process is done in units of a predetermined unit-time interval (one frame). The "unit-time interval (1 frame)" is a continuous time interval of 4 seconds, for example.

By sampling the one frame (4 seconds) with a clock signal of which the sampling frequency is 20 Hz, it is possible to acquire 80 samples per frame. Further, information for a predetermined number of frames such as 10 frames, 20 frames or the like, for example, is accumulated, and the total sound volume calculation and tempo identification are done based on the accumulated information.

Next, the operations in steps S1 and S2 shown in FIG. 3 will be described in detail.

Figure 4:
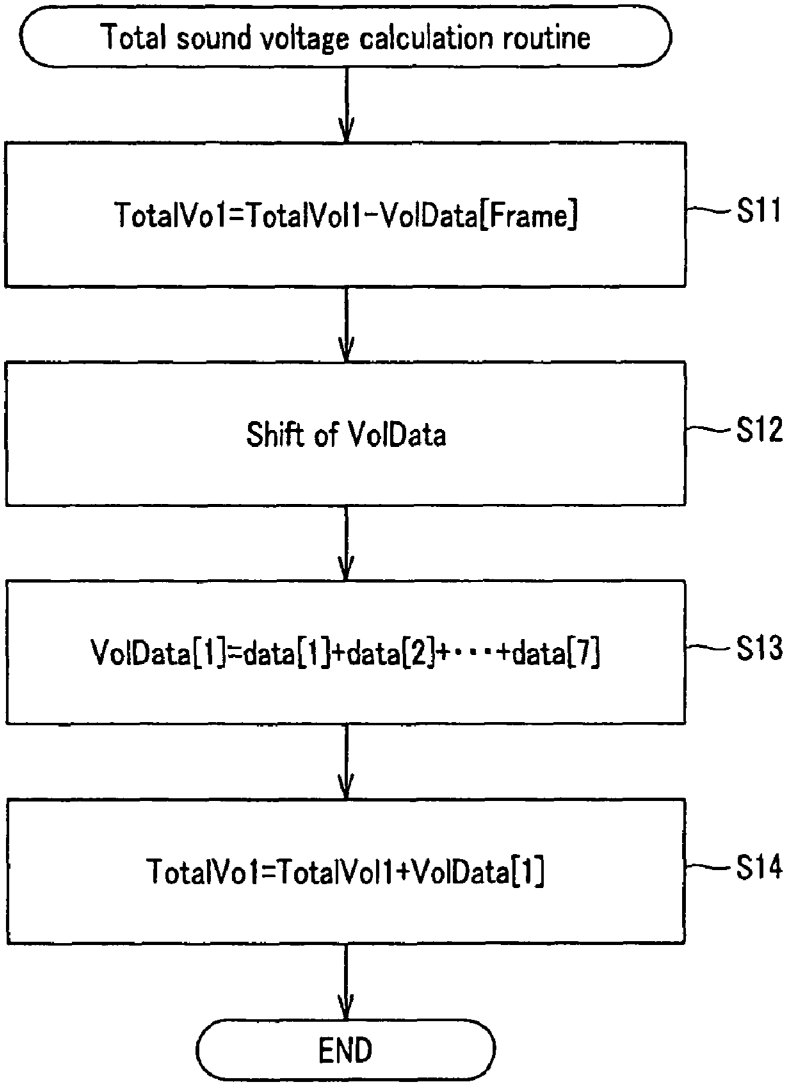
FIG. 4 also shows a flow of operations made in the total sound voltage calculation routine executed in step S1 of the main routine shown in FIG. 3.

First, the calculation of the total sound voltage in step S1 will be explained with reference to FIG. 4. FIG. 4 shows a flow of operations made in the total sound voltage calculation routine in step S1 in FIG. 3.

A data buffer for a total sound voltage in the 7 bands in each of a plurality of successive frames for which the result of calculation are accumulated is taken as "VolData[Frame]", storage buffer for sound volume data in each band is taken as "data[band]", and storage buffer for the total sound volume is taken as "TotalVol", as shown in FIG. 4 as well.

Note also that "[Frame]" referred to herein is a number of frames for which the total sound voltage is to be calculated, and a frame corresponding to the [Frame] position is the oldest one of the plurality of successive frames for which the result of calculation are to be accumulated. The "[band]" is a number for a frequency band.

On the assumption that a sound volume buffer for the current latest frame to be subjected to the process is "VolData[1]" and a sound voltage buffer for the oldest one of the plurality of successive frames for which the result of calculation is to be accumulated is "VolData[Frame]", the CPU 91 in the controller 9 will first subtract the sound volume in the oldest frame from the total sound voltage "TotalVol" (in step S11) as shown in FIG. 4.

Next, the CPU 91 will shift data stored in the buffers VolData[1] to VolData[Frame] by one buffer (in step S12). In case VolData[Frame]=VolData[5], for example, the CPU 91 will shift data VolData[4] to VolData[5], VolData[3] to VolData[4], VolData[2] to VolData[3], and VolData[1] to VolData[2].

Then, the CPU 91 will add together level data in frequency bands "data[1]", "data[2]", "data[3]", "data[4]", "data[5]", "data[6]" and "data[7]" in the latest frame from the analysis data extraction unit 62, and sets the result of addition as data indicative of the sound voltage in the latest frame in the buffer VolData[1] (in step S13).

By adding the sound voltage in the latest frame to be processed, determined in step S13 to the TotalVol holding the total sound, the CPU 91 determines a total sound volume for a number [Frame] of frames for which a total sound voltage is calculated in a direction from the latest frame toward the old one (in step S14).

With the calculation of the total sound volume of a sound signal to be processed as above and using the calculated total sound volume as one of parameters, it is possible to selectively display video data.

Note that although in this embodiment, the total sound volume is calculated based on the sound level in the plurality of divided frequency bands, it may be calculated based on the sound level waveform of a supplied sound signal or based on the sound level waveform of a sound signal of a frequency included in a frequency band of a filter which extracts a component in a specific frequency band such as the middle-frequency range.

Figure 5:
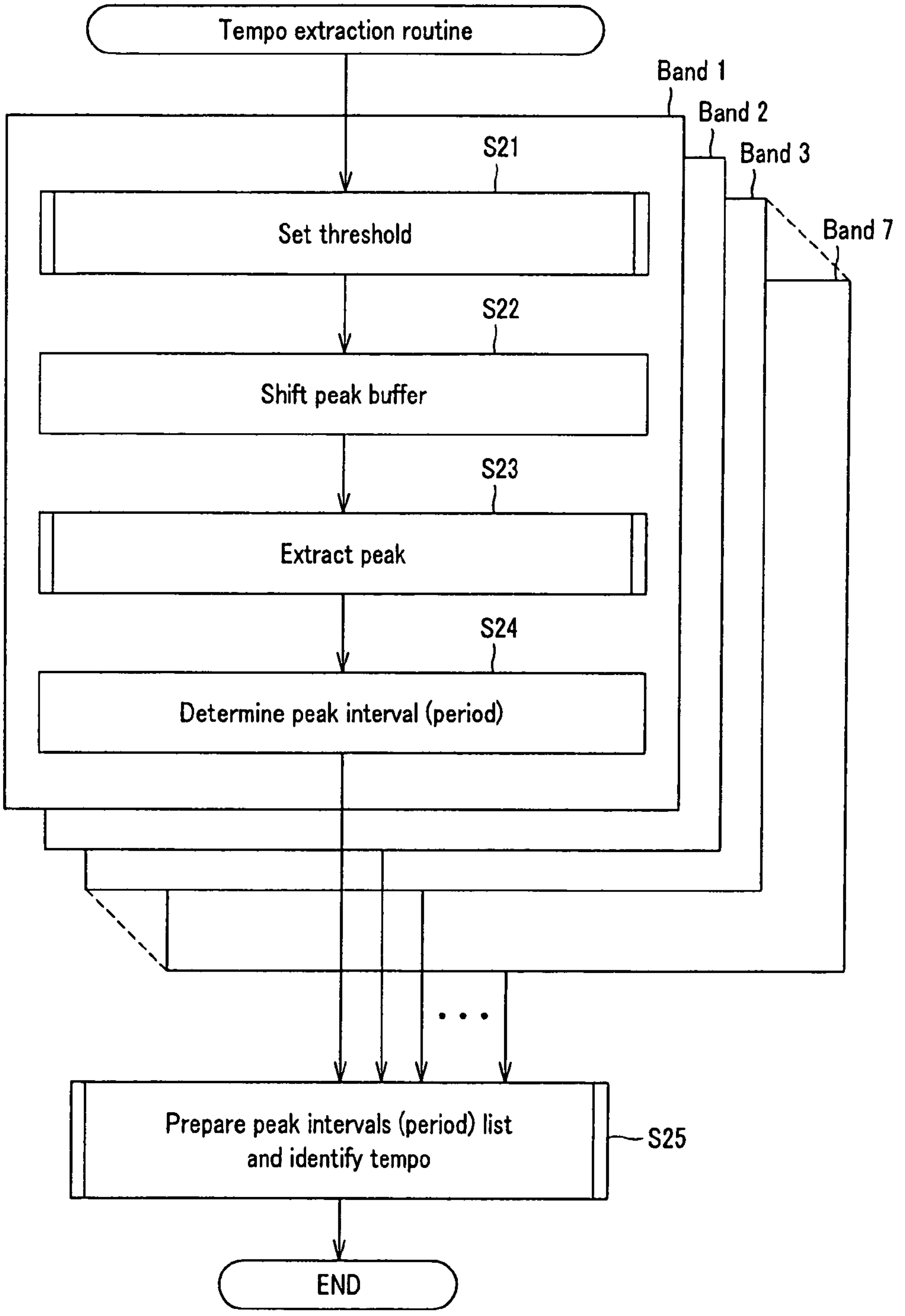
FIG. 5 shows a flow of operations made in the tempo extraction routine executed in step S2 of the main routine shown in FIG. 3.

Next, the tempo extraction routine effected in step S2 in FIG. 3 will be explained in detail with reference to FIG. 5. FIG. 5 shows a flow of operations made in the tempo extraction routine effected in step S2 in FIG. 3. As shown in FIG. 5, operations in steps S21 to 24 are done with respect to sound signal of a frequency in each of the divided bands.

Namely, the CPU 91 of the controller 9 sets a threshold for each of the divided frequency bands (in step S21) and shifts the content of a peak position detecting peak buffer provided in the RAM 93 or nonvolatile memory 94, for example (in step S22). Then, the CPU 91 extracts peak positions (apex of change in level) of higher levels than the thresholds set in step S21 (in step S23), and determines a peak interval between peak positions (time interval between peak positions) on the basis of the extracted peak positions (in step S24).

After completion of the operations made in steps S21 to S24 conducted for each of the divided frequency bands, the CPU 91 of the controller 9 will make a single list of the peak intervals sin the divided frequency bands to identify a peak interval (peak period) having occurred most frequently as the tempo of the sound (in step S25).

Next, the threshold setting in step S21, peak extraction in step S23 and tempo identification in step S25 in the tempo extraction routine in FIG. 5 will be described in further detail with reference to FIG. 6.

Figure 6:
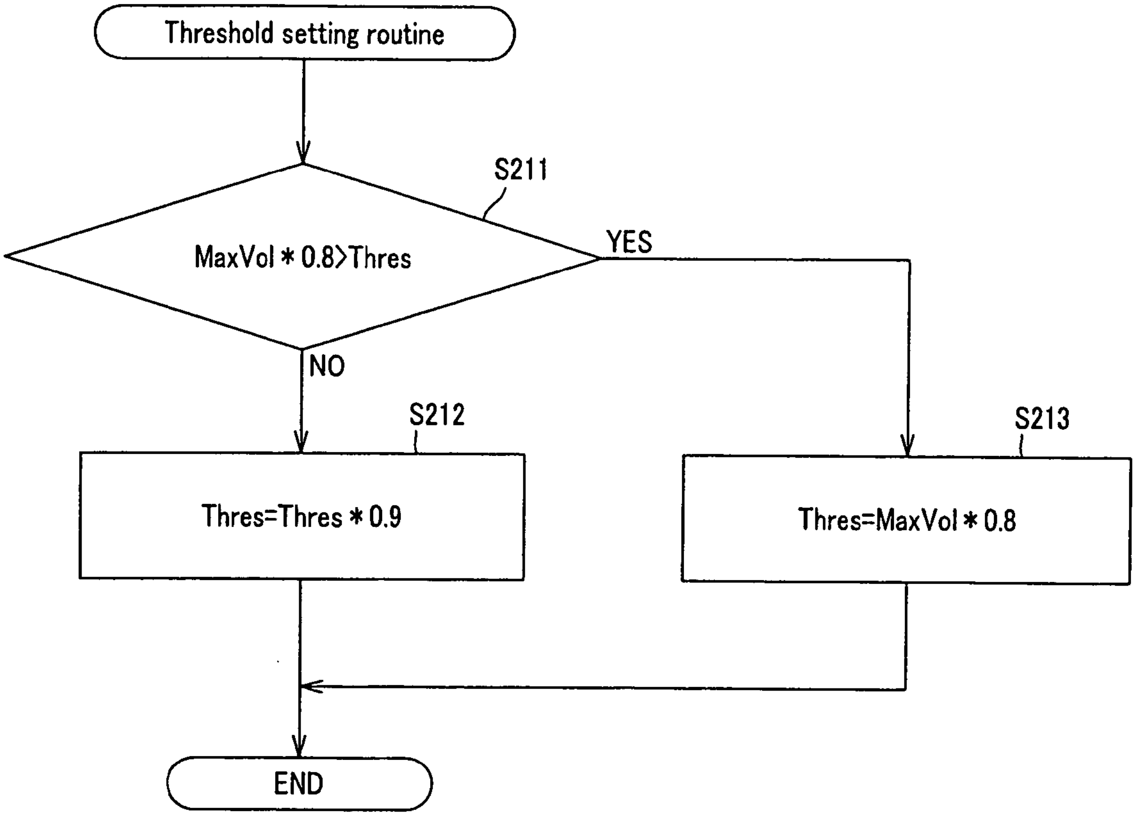
FIG. 6 shows a flow of operations made in the threshold setting routine executed in step S21 of the tempo extraction routine shown in FIG. 5.

FIG. 6 shows a flow of operations made in the threshold setting routine executed in step S21 in the tempo extraction routine in FIG. 5. In this embodiment, this operation is similar to that included in the total sound volume calculation effected in step S1 as in FIG. 3. The CPU 91 determines a maximum sound voltage level in each of one frame (4 seconds) in each of the divided frequency bands, and holds the determined value as "MaxVol[band]". For executing the threshold setting routine for a next frame (4 sec), the CPU 91 removes the MaxVol[band] thus held, multiplies it by 0.8, for example, to determine a level equivalent to 80% of the maximum sound volume MaxVol[band], and judges whether the level thus determined is higher than a threshold Thres determined for a preceding frame (4 seconds) (in step S211).

When the CPU 91 has determined in the judgment in step S211 that the level is higher than 80% of the maximum sound volume MaxVol[band], it will determine that the sound volume has become lower, and set the threshold Thres to a level equivalent to 90% of the threshold Thres (in step S212).

If the CPU 91 has determined in the judgment in step S211 that the threshold Thres is lower in level than 80% of the maximum sound volume MaxVol[band], it will determine that the sound volume has become higher, and set the threshold Thres to a level equivalent to 80% of the new maximum sound volume MaxVol[band] (in step S213).

In the car stereo system according to the present invention, the threshold Thres can appropriately be changed both when the sound volume in each of the divided frequency bands has become lower and when it has become higher. Using the threshold Thres as a reference value for detection of the peak positions of a sound signal, the tempo of sound can accurately be identified.

Figure 7:
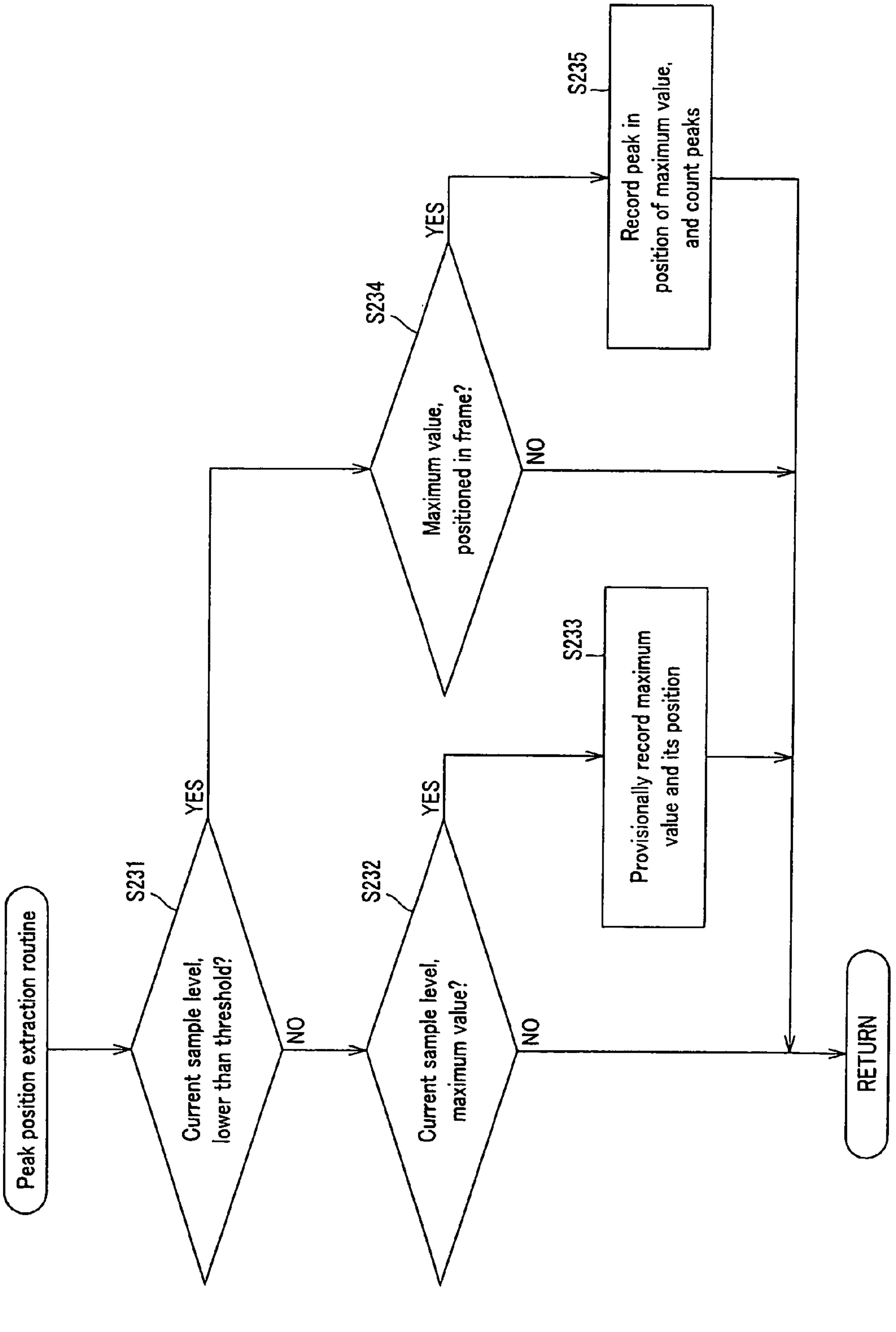
FIG. 7 shows a flow of operations made in the peak position extraction routine executed in step S23 of the tempo extraction routine shown in FIG. 5.

Next, the peak position extraction routine executed in step S23 in the tempo extraction routine as shown in FIG. 5 will be explained in detail with reference to FIG. 7. FIG. 7 shows a flow of operations made in the peak position extraction routine executed in step S23 in FIG. 5. As having been described in the above, this embodiment uses a clock signal whose sampling frequency is 20 Hz, samples a sound signal 80 times per 4 seconds (one frame) to detect the level of the sound signal. Then, each of the samples will be processed as shown in FIG. 7.

First, the controller 9 judges whether the current sample level is lower than the threshold Thres set as having been described with reference to FIG. 6 (in step S231). If the controller has determined in step S231 that the current sample level is not lower than the threshold Thres, since the current sample level is possibly the maximum value, the controller 9 will make a comparison between a level already registered provisionally as a candidate for the maximum value and the current sample level to judge whether the current sample level is higher (in step S232).

If the controller 9 has determined in step S232 that the already registered level as the candidate for the maximum is higher, it will exit the routine shown in FIG. 7 without doing anything. If the controller 9 has determined in step S232 that the current sample level is higher than the provisionally registered level as the candidate for the maximum, the controller 9 will exit the routine shown in FIG. 7 with provisionally registering the current sample level and position of the sample (in step S233). It should be noted that the current sample level and sample position are provisionally registered in a provisional registration area in the RAM 93 or nonvolatile memory 94, for example.

Also, if the controller 9 has determined in step S231 that the current sample level is lower than the threshold Thres, it will judge whether the sample position of the level having provisionally been registered in step S233 is within the current frame to be processed (in step S234).

If the controller 9 has determined in step S234 that the sample position of the provisionally registered level is not within the current frame to be processed, since the frame to be processed has shifted to a next frame, the controller 9 will exit the routine shown in FIG. 7 without doing anything.

If the controller 9 has determined in step S234 that the sample position of the provisionally registered level is within the current frame to be processed, it will additionally record the level provisionally registered as the candidate for a peak and its sampling position as a peak level and peak position into a predetermined area (maximum-value position information area), count up the number of peaks by one, and exit the routine shown in FIG. 7.

In this car stereo system according to the present invention, a peak level can be detected by making only a relatively simple comparison without calculation of autocorrelation, to thereby extract the position of that peak level (peak position).

In this car stereo system, a peak interval (time interval between peak positions) can be determined in step S24 in FIG. 5 on the basis of a peak position determined by effecting the peak position extraction routine in FIG. 7 in step S23 of the tempo extraction routine in FIG. 5.

Figure 8:
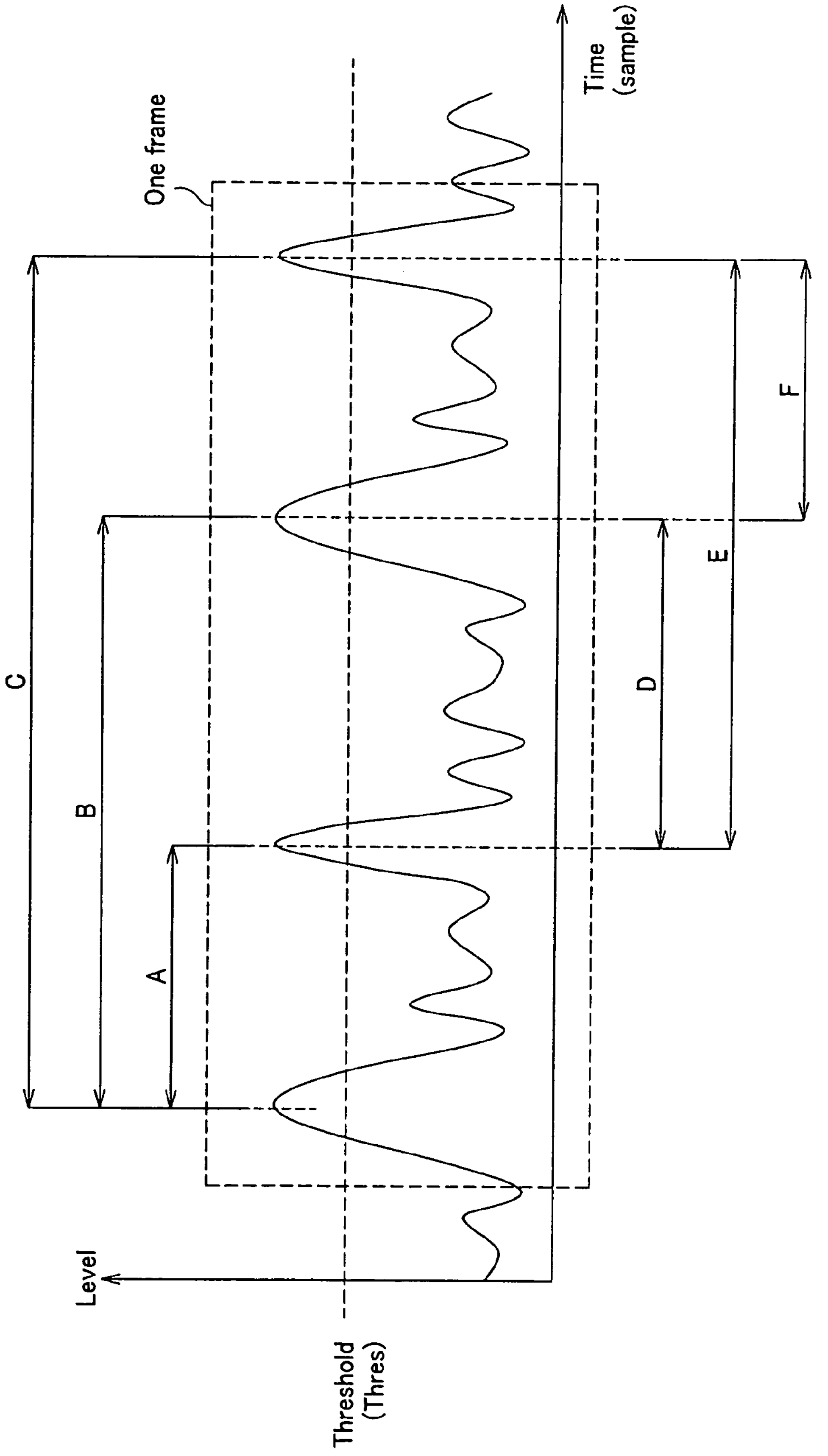
FIG. 8 explains the peak position extraction routine.

FIG. 8 explains the detection of a peak interval, effected according to the present invention. Determination of a peak interval in case there are four positions of peaks (peak points) higher than the threshold Thres in one frame will be described below with reference to FIG. 8.

The controller 9 determines peak intervals on the basis of information indicative of peak positions stored and held in the RAM 93 or nonvolatile memory, for example, so that one and same interval will not doubly be determined. The peak intervals are indicated with alphabets A, B, C, D, E and F, respectively, as shown in FIG. 8.

In the example shown in FIG. 8, an interval between two peaks is determined with each of the four peak positions being taken as a reference position. However, an interval from one peak position as the reference position to any other peak position is the same as an interval from the other peak position to the one peak position. If these intervals have been determined, one of them should be selected.

Therefore, in the example shown in FIG. 8, peak intervals are determined between each of the four peak positions and other three and thus 12 peak intervals will be determined. By selecting only one of the intervals having doubly been determined as above, six peak intervals A, B, C, D, E and F can be detected as shown in FIG. 8.

The peak interval detection is effected with respect to the level data in each frequency band in a frame to be processed. The peak intervals thus determined in each frequency band in the frame to be processed are recorded in a peak intervals (period) list (will be referred to as "periods list" hereunder), and the tempo of a musical composition to be reproduced will be identified based on the periods list.

Figure 9:
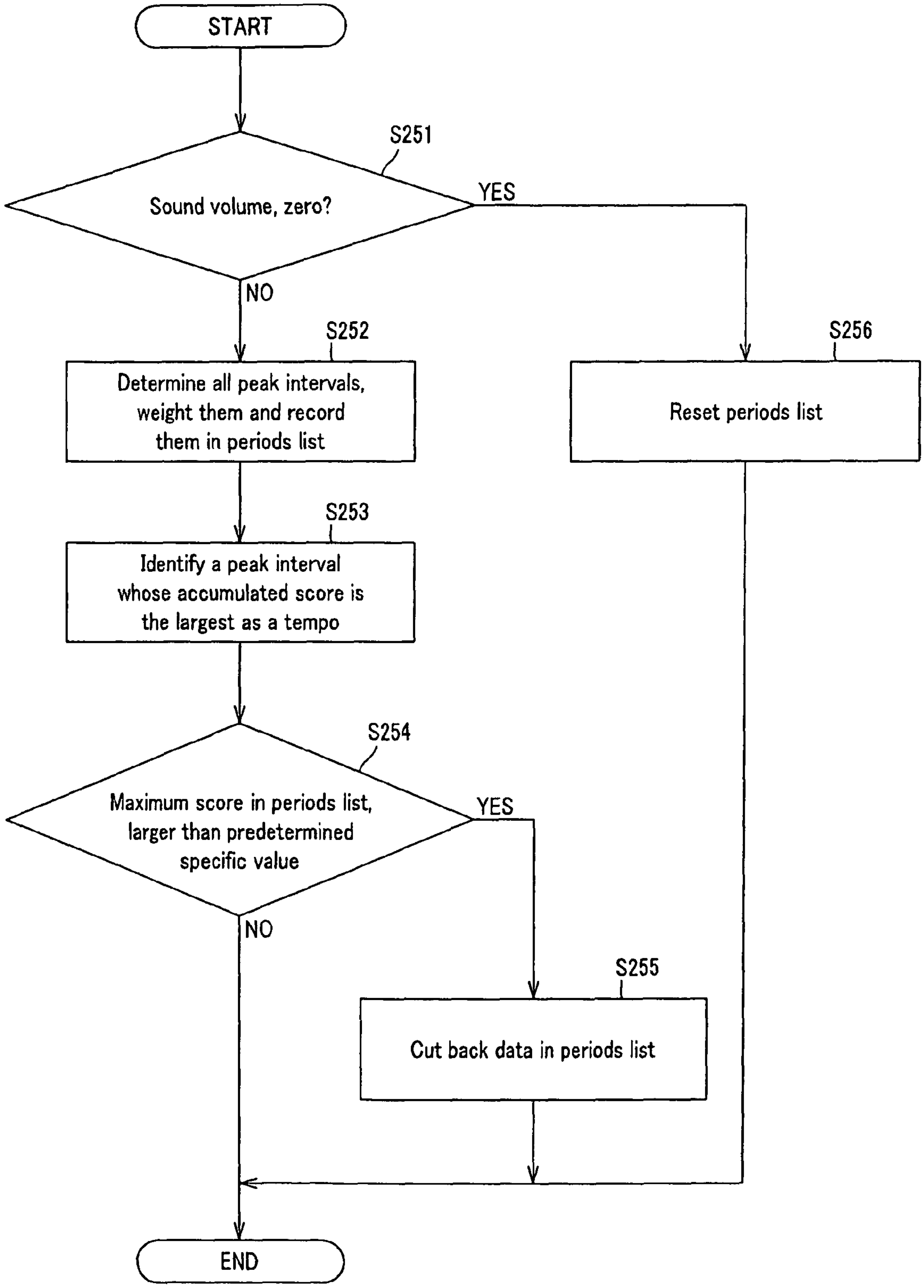
FIG. 9 shows a flow of operations made in the peak interval (period) list preparation routine and tempo identification routine executed in step S25 in the tempo extraction routine shown in FIG. 5.

FIG. 9 shows a flow of operations made in the periods list preparation and tempo identification executed in step S25 as in FIG. 5. The operations in the flow diagram shown in FIG. 9 are performed by the controller 9.

First, the controller 9 judges whether the sound volume is currently zero (in step S251). The judgment may be done by checking the aforementioned total sound volume TotalVol or by checking any separately detected sound volume level of an input sound signal.

Note that for the judgment to be done in step S251, it may be assumed that the sound volume will not completely be zero and it may be determined when the sound signal whose sound level is lower than the specific threshold continues for more than the specific sample, for example, that the sound volume has become zero, that is, reproduction of a musical composition is over.

If the controller 9 has determined in step S251 that the sound volume is not zero, it will record all peak intervals determined as having been described above with reference to FIG. 7 into the periods list with the score of the detected peak intervals being weighted (in step S252). The periods list is such that in a coordinate whose horizontal axis indicates the peak interval and vertical axis indicates the score (number of times of detection of peak intervals) as shown in FIG. 10 for example, the number of times of detection of peak intervals in each of the divided frequency bands in a frame to be processed is accumulated.

For the weighting, a predetermined value is preset for the magnitude of a peak interval in each of the divided frequency bands. For example, a high frequency band may be weighted with a smaller value than that for weighting of a middle frequency band. Alternatively, each frequency band may be weighted with the same value.

Figure 10:
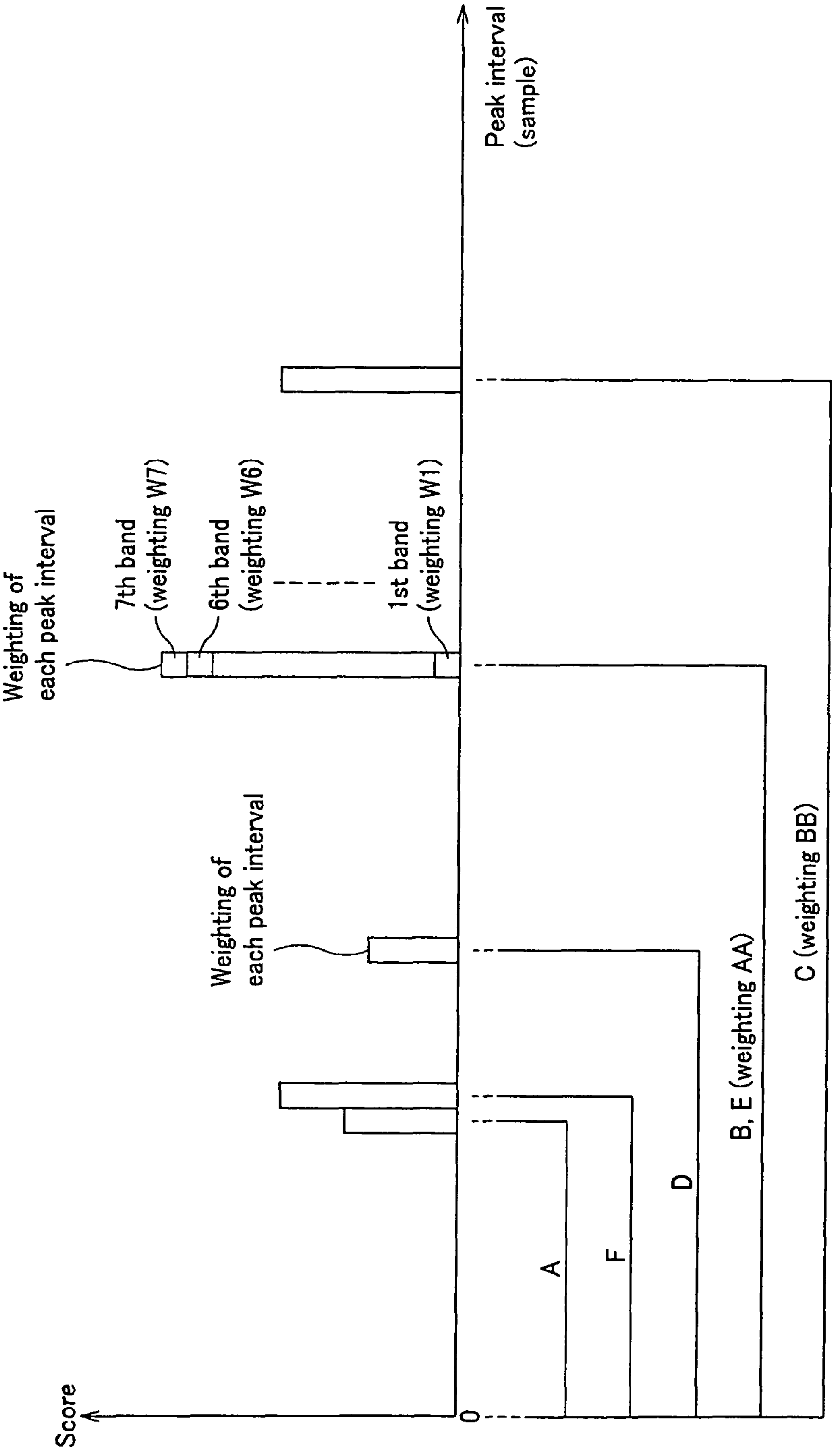
FIG. 10 explains the periods list (peak intervals list) preparation routine.

Note that in this embodiment, the divided frequency bands are weighted as indicated with W1, W2, W3, . . . , respectively, and peak intervals are weighted as indicated with AA and BB, respectively, as shown in FIG. 10. The score of detected peak intervals is calculated as follows:

Scores of peak intervals B and E=$AA$*(Score of first band*$W1$+Score of second band*$W2$+ . . . +Score of sixth band*$W6$+Scope of seventh band*$W7$)

In this embodiment, the score of each peak interval is calculated by weighting each peak interval and each frequency band.

The periods list shown in FIG. 10 shows that the number of times of detection of the peak intervals B and E, same ones of the peak intervals detected as having been described with reference to FIG. 8, is the largest. The controller 9 identifies, based on the prepared periods list, a number of times of detection, that is, a peak interval whose accumulated score is the largest, as a tempo (in step S253).

Next, the controller 9 will judge whether the maximum score in the periods list exceeds a predetermined specific value (in step S254). The tempo has to be identified quickly on the basis of the periods list. So, the accumulation of more data than necessary in the periods list is not desirable because of its possibility of leading to delay of the processing, wasting of the memory, etc.

If the controller 9 has determined in step S254 that the maximum score in the periods list is not larger than the predetermined specific value, it will exit the operation shown in FIG. 9. Also, if the controller 9 has determined in step S254 that the maximum score in the periods list is larger than the predetermined specific value, it will cut back the data in the periods lust (in step S255) and exit the operation in FIG. 9.

Figure 11:
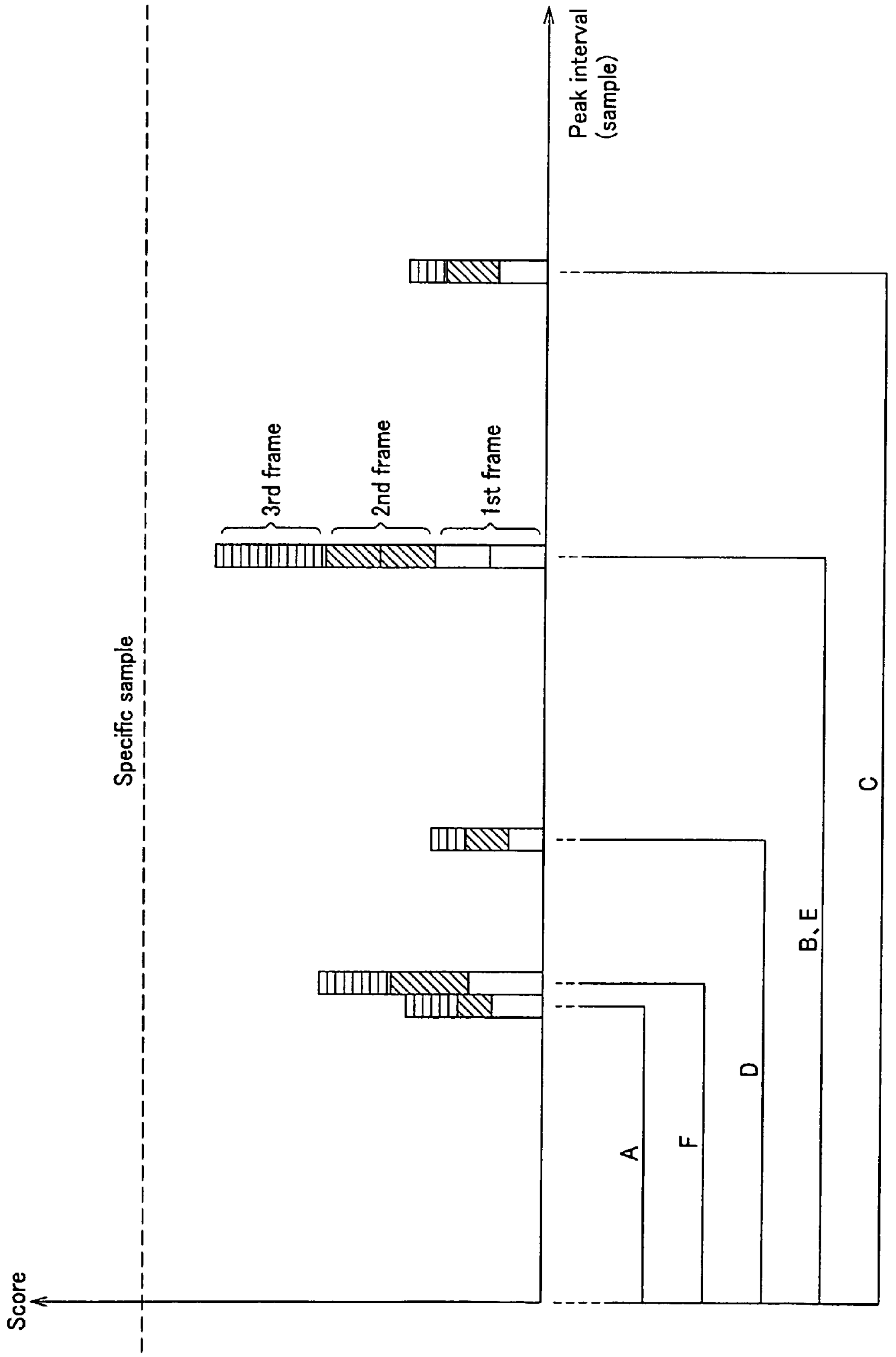
FIG. 11 explains the periods list cutback routine.

In step S255, the data in the periods list is cut back when the score of peak intervals accumulated exceeds the specific value as having been described above and also shown in FIG. 11. More specifically, the cutback is effected by subtracting a predetermined score from the score of peak intervals in the periods list or subtracting a score of peak intervals in the oldest frame, for example, among the data recorded in the periods list or a score of peak intervals for a plurality of frames in a direction from the oldest toward latest frame.

When it is determined in step S251 in FIG. 9 that the sound volume is zero, it can be determined that the reproduction of a musical composition is over. In this case, the controller 9 will reset the periods list prepared as shown in FIG. 10 (in step S256) and exit the operation in FIG. 9 with getting ready for analysis of the tempo of a new musical composition to be reproduced.

Figure 12:
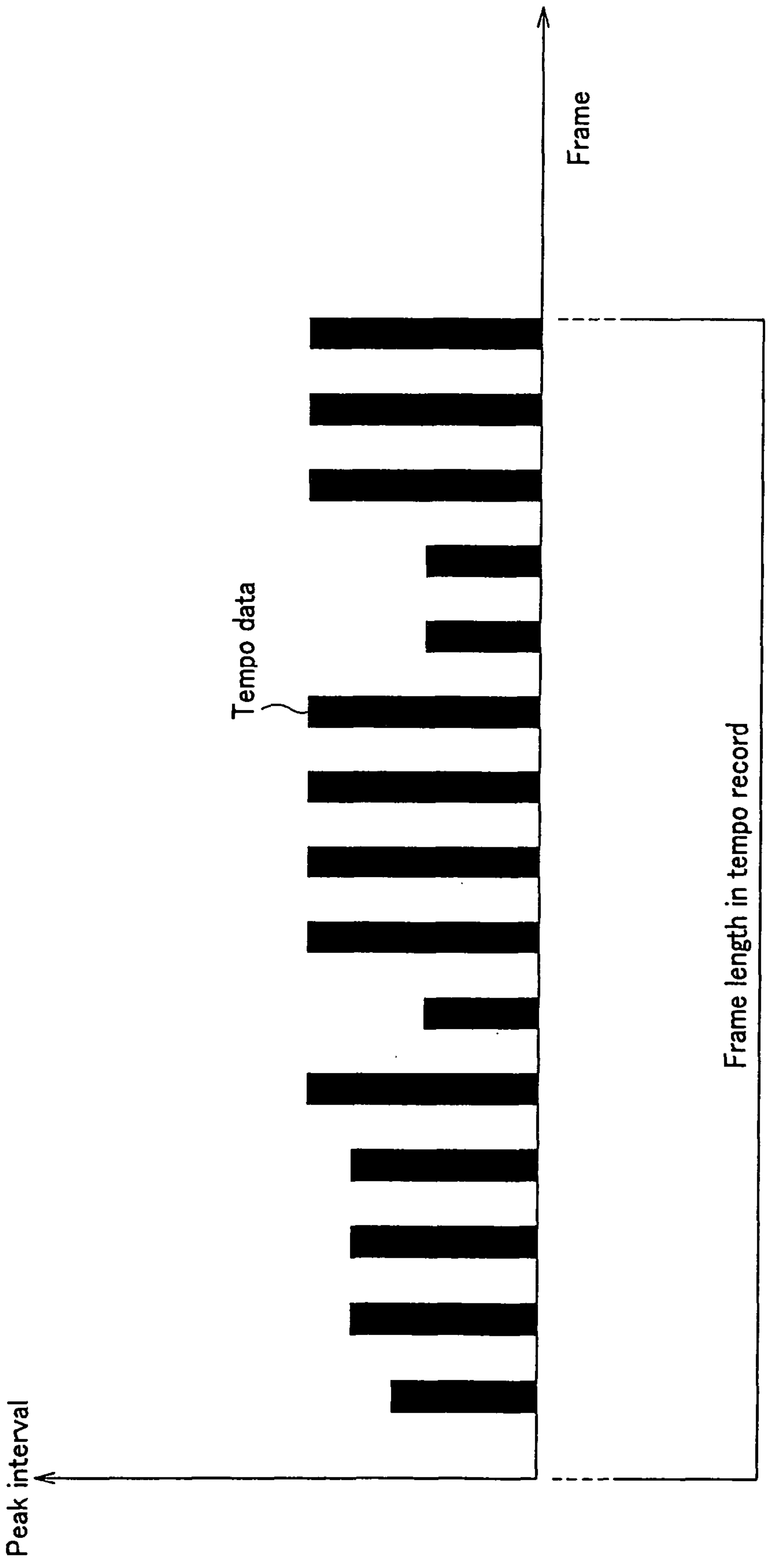
FIG. 12 explains keeping and use of a peak interval having occurred most frequently in each frame.

Note that in this car stereo system, the controller 9 accumulates information indicative of a peak interval whose number of times of detection in each frame is largest for a plurality of frames, for example, 1000 frames. As shown in FIG. 12, for example, the controller 9 will hold data indicative of a peak interval whose frequency of occurrence is highest in each frame as shown in FIG. 12.

Even if the peak interval in a frame has suddenly changed largely, holding information indicative of peak intervals also in past frames having been processed permits to appropriately identify the tempo of a musical composition to be reproduced without being largely influence by such a sudden change of the peak interval by referring to the information indicative of peak intervals in frames before and after the frame in which the peak interval has changed so.

In the car stereo system according to the present invention, after having identified the tempo of the musical composition to be reproduced as above, the controller 9 will read video data on a still image, for example, held in the ROM 92 on the basis of the identified tempo, and control the LCD 10 to display the still image with the read video data.

In the car stereo system, a still image displayed on the LCD 10 is determined based on the tempo and sound volume of the musical composition to be reproduced. That is, an area of 9 blocks by 9 blocks is provided on a coordinate plane virtually defined by a horizontal axis indicating the tempo and a vertical axis indicating the sound volume as shown in FIG. 13.

Video data forming an image is uniquely determined correspondingly to a block determined by the tempo and sound volume of a musical composition. That is, video data forming an image is determined correspondingly to each of 81 blocks shown in FIG. 13.

Figure 13:
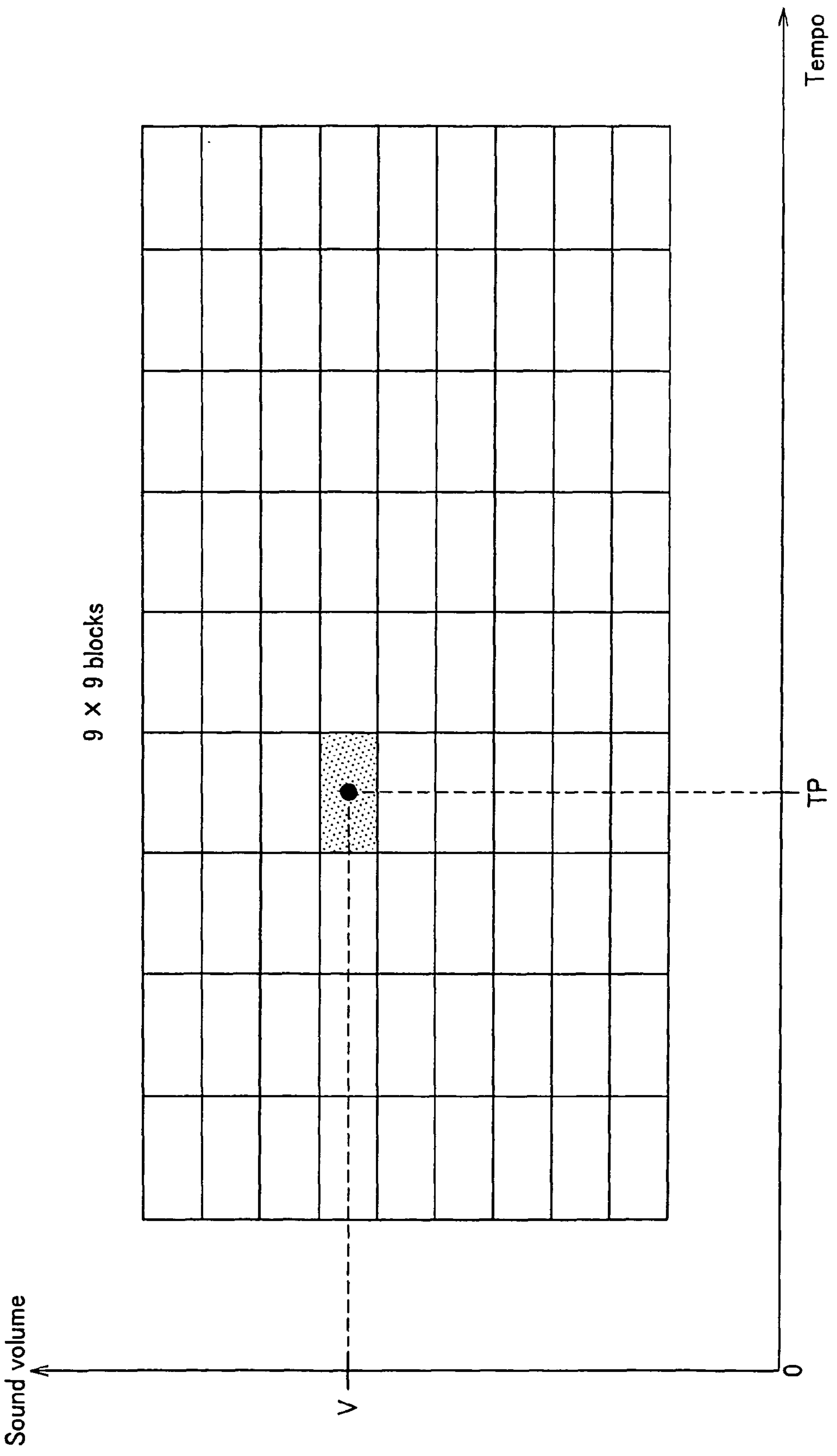
FIG. 13 explains a structure in which usable video data is identified based on an identified tempo and sound volume.

Therefore, if a tempo TP and sound volume V of a musical composition are known as shown in FIG. 13, for example, video data allocated to a block to which a coordinate defined by TP and V belongs is read from the ROM 92, and a still image formed from the read video data is displayed on the display screen of the LCD 10 under the control of the controller 9.

Note here that the ROM 92, for example, stores and holds video data forming 81 still images corresponding to at least 81 blocks, respectively, set as shown in FIG. 13. Since video data does not possibly belong to any of the blocks shown in FIG. 13 in practice, however, the car stereo system may be adapted so that the ROM 92 will also store and hold a plurality of video data forming a still image which are to be used when the video data does not belong to any block. Therefore, in this embodiment, the ROM 92, for example, stores and holds video data for about 100 still images.

Although it has been described above that in the car stereo system according to the present invention, a still image corresponding to a tempo and sound volume is displayed on the display screen of the LCD 10, it is of course possible to display a moving for a predetermined length of time or repeatedly display a moving image for a predetermined length of time.

Figure 14:
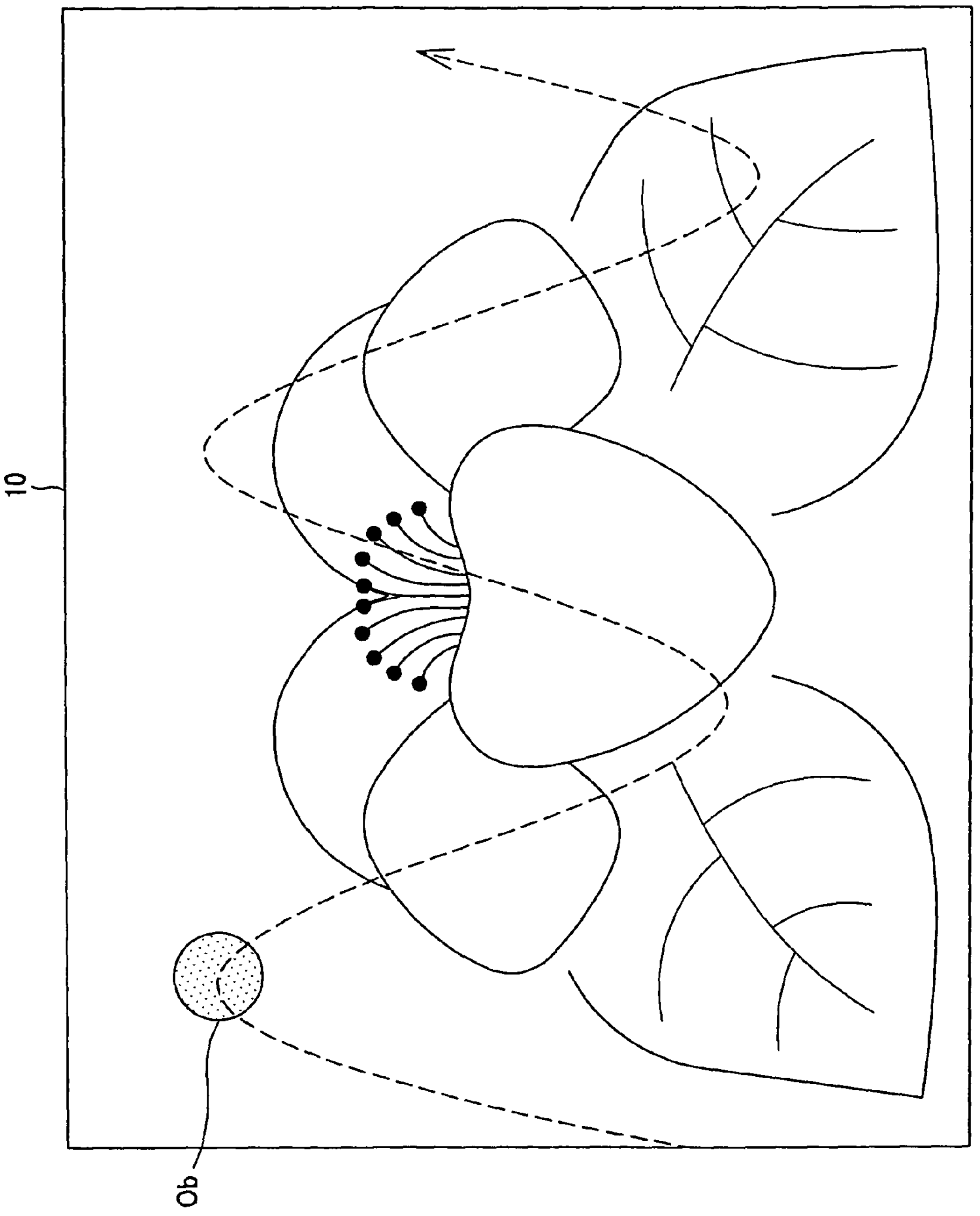
FIG. 14 shows an example of an image to be selected and displayed with the use of the identified tempo.

Further in the car stereo system according to the present invention, an image corresponding to a tempo and sound volume is not only be displayed on the display screen of the LCD 10 as above when a musical composition is reproduced but also a display object such as a predetermined graphic, character or the like is displayed and moved as an object Ob in FIG. 14 for example on the display screen of the LCD 10.

In this case, a moving pattern, moving speed, etc. of the object Ob are determined depending upon an identified tempo, for example. The quicker the tempo, the more quickly the object Ob is to be moved. The slower the tempo, the more slowly the object Ob is to be moved. Of course, a moving pattern and speed may be selected according to a tempo and sound volume. Also, a plurality of display objects Ob to be displayed and moved may be prepared and one of the display objects may be selected according to an identified tempo or an identified tempo and sound volume.

In the car stereo system according to the present invention, the tempo of sound such as a musical composition to be reproduced can be identified simply, rapidly and accurately without having to make any complicated operations such as autocorrelation calculation and the like. Therefore, the controller of the car stereo system can identify the tempo of sound to be reproduced without any large load to the controller.

Thus, an image to be displayed on the LCD 10 can be identified according to an identified tempo, and displayed for the user to see. Also, an display objected can be displayed on the display screen of the LCD 10 correspondingly to a tempo, and moved correspondingly to the tempo. That is, different from a graphic equalizer using physical information, the car stereo system can provide video information in a new manner correspondingly to an identified tempo which is musical information.

Note that although a sound signal to be reproduced is divided into 7 frequency bands and processed in each frequency band as in the aforementioned embodiment, the present invention is not limited to this frequency division but may be divided in any number of frequency bands. That is, the signal may not be divided into frequency bands but a sound signal having all frequency bands may be subjected to the aforementioned processing.

Even in case a sound signal to be reproduced is divided into a plurality of frequency bands, sound signals of frequencies in all the divided bands may not be processed but one or more of the divided frequency bands may be selected for processing. Alternatively, a sound signal of a frequency in a band to be reproduced may be extracted by a bandpass filter and processed as above.

Also, in this embodiment, a threshold for the level of a sound waveform is calculated based on the maximum sound volume in a preceding frame to detect a peak position. However, the present invention is not limited to this arrangement. A preset threshold for a sound waveform may be preset. Also, a predetermined one of a plurality of predetermined values may be selected for use correspondingly to the level of a selected sound volume.

In the aforementioned embodiment, a peak interval is detected with reference to all peak positions with exclusion of substantially overlapping intervals. However, a peak interval may be detected for use with reference to one or more arbitrary peak positions in each frame. That is, all peak positions may be used as reference positions without detection of any peak interval.

Also in the embodiment, one frame is of 4 seconds and a clock signal of 20 Hz in sampling frequency is used. However, the present invention is not limited to these frame and clock signal. The time length of one frame and sampling frequency may be appropriate ones selected correspondingly to the performance of a CPU etc. installed in an apparatus such as the car stereo system.

Further in the embodiment, for example a still image is displayed along with a display object on the LCD correspondingly to an identified tempo and total sound volume and the display object is moved. The processing may be done otherwise for an identified tempo.

For example, in case a musical composition whose tempo is fast is being played, the low and high frequency bands may be emphasized. Also, in case a musical composition having a slow tempo is being played, various adjustments may be done, for example, the musical composition may be reproduced in surround sound or in somewhat stronger reverberation.

That is, the equalizer can be controlled, surround-sound effect be selected, volume be controlled or other similar adjustments be done correspondingly to the identified tempo of a musical composition being played.

The aforementioned embodiment is an application of the present invention to a car stereo system by way of example, but the present invention is not limited to the car stereo system. The present invention is applicable to various types of audio and audio/visual devices, each capable of reproducing and outputting a sound signal, such as a home stereo system, CD player, MD player, DVD player, personal computer or the like.

In case the present invention is applied to a home stereo system, for example, the interior illumination, room temperature or the like can be adjusted correspondingly to an identified tempo.

Also, in the aforementioned embodiment, a sound signal is divided into frequency bands by a conventional integrated circuit (IC). However, the present invention is not limited to this way of frequency band division. Frequency band division of a sound signal can be effected according to a program which is executed in the controller 9, for example.

The present invention can satisfactorily be implemented by a software. More specifically, a first program can be prepared which includes a detecting step of detecting positions of ones, higher than a predetermined threshold, of peaks of change in level of a sound signal supplied to a computer in a sound signal processor, a time interval detecting step of detecting a time interval between at least a predetermined one and other one of the detected peak positions in a predetermined unit-time interval and an identifying step of identifying the tempo of sound to be reproduced with the sound signal on the basis of one, having occurred at a high frequency, of the detected time intervals. The apparatus and method according to the present invention can be implemented by supplying this program to an audio device or audio/visual device via cable, radio or a recording medium and having the device execute the program.

Also, a second program can be prepared in which in the identifying step in the above first program, the frequency of occurrence of the time interval between the peak positions detected in a plurality of the unit-time intervals is accumulated and the tempo of the sound to be reproduced is identified on the basis of the frequency of occurrence thus accumulated.

Also, as in the car stereo system, a third program can be prepared which further includes, in addition to the steps included in the first program, a frequency band dividing step of dividing the supplied sound signal into a plurality of frequency bands, and in which in the detecting step, the peak position is detected in each of at least one or more of the divided frequency bands; in the time interval detecting step, the time interval of the peak position is detected in each of the at least one or more frequency bands; and in the identifying step, the tempo of the sound to be reproduced is identified based on the one, having occurred at a high, of the time intervals detected in each of at least one or more frequency bands.

Also, a fourth program can be prepared which includes, in addition to the steps included in the first program, a sound volume calculating means of calculating the sound volume of sound to be outputted on the basis of a sound signal to be outputted, and a threshold setting step of setting a threshold used to detect a peak position with reference to the calculated sound volume.

Also, a fifth program can be prepared which includes, in addition to the steps included in the first program, an image extracting step of extracting video data on an image to be displayed on an image display device from video data stored in a memory, and a displaying step of displaying an image corresponding to the extracted video data on the image display device.

Also, a sixth program can be prepared which includes, in addition to the steps included in the first program, a controlling step of controlling the size, moving speed and moving pattern of an image to be displayed on an image display device on the basis of an identified tempo.

As above, the tempo analysis apparatus and method according to the present invention can also be implemented by the above prepared. The prepared programs can be provided to the user via various electric communication links such as the Internet, telephone network and the like and a data broadcast, and also by distributing a recording medium having recorded therein the programs including the above-mentioned steps.

INDUSTRIAL APPLICABILITY

As having been described in the foregoing, according to the present invention, the tempo of a musical composition can be detected simply and accurately without having to make any complicated computational operations such as autocorrelation calculation. Also, information can be provided and various types of control be made, correspondingly to the detected tempo. Since connection of a network can be detected using hardware interrupt and link can be established, the load to the system can be minimized and connection of a network cable allows the user to readily use the network.

The invention claimed is:

1. A tempo analyzing apparatus comprising:

a frequency band extracting means for extracting a sound signal of a frequency in a predetermined frequency band from an input sound signal;

a volume calculating means for calculating a volume of the sound signal extracted by the frequency band extracting means;

a threshold setting means for setting a threshold used to detect a peak of change in level with reference to the volume calculated by the volume calculating means;

a peak detecting means for detecting positions of a plurality of ones, higher than a predetermined threshold, of peaks of change in level of the sound signal extracted by the frequency band extracting means, the peaks of change in level being detected in accordance with the threshold set by the threshold setting means, the positions including at least one reference position;

a time interval detecting means for detecting a time interval between the at least one reference position and one or more others of the positions detected by the peak detecting means in a predetermined unit-time interval;

an interval frequency detecting means for identifying a frequently occurring one of the time intervals detected by the time interval detecting means;

an identifying means for accumulating a frequency of occurrence of each time interval between the positions of peaks detected in a plurality of unit-time intervals and identifying the tempo of the sound to be reproduced with the input sound signal on the basis of a maximum one among all the accumulated frequencies of time interval occurrence, wherein when the identifying means determines that a frequency of occurrence for a time interval exceeds a value, the identifying means reduces frequency of occurrence for at least one time interval;

an image display device; and a display controlling means for causing an image to be displayed on the image display device, the image corresponding to the tempo identified by the identifying means and not to a tempo identified using any autocorrelation calculation or beat structure analysis.

2. The apparatus according to claim 1, wherein:

the frequency band dividing means is for extracting a sound signal in a plurality of frequency bands from the input sound signal;

the peak detecting means is for detecting the peak positions for one or more of the plurality of frequency bands extracted by the frequency band dividing means;

the time interval detecting means is for detecting a time interval between at least one reference position and one or more others of the positions for each of the one or more frequency bands; and the identifying means is for identifying the tempo of sound to be reproduced on the basis of the frequently occurring one of the time intervals detected for each of the one or more frequency bands.

3. The apparatus according to claim 2, wherein:

the volume calculating means is for calculating volumes of sound signals of frequencies included in one or more of the plurality of frequency bands extracted by the frequency band dividing means; and the threshold setting means is for setting a threshold used to detect a peak position with reference to the volume calculated by the volume calculating means.

4. The apparatus according to claim 1, further comprising:

a storage means for storing video data on a plurality of images displayable on the image display device;

wherein the display controlling means selects and reads data from the storage means and causes an image corresponding to the read video data to be displayed on the image display device.

5. The apparatus according to claim 4, wherein the display controlling means controls at least one of a size, moving speed and moving pattern of an image to be displayed on the image display device which displays an image corresponding to video data read from the storage means.

6. The apparatus according to claim 4, wherein the display controlling selectively reads video data from the storage means on the basis of the tempo identified by the identifying means and sound volume calculated by the volume calculating means.

7. A tempo analyzing method comprising steps of:

extracting a sound signal of a frequency included in a predetermined frequency band from the input sound signal; and calculating a volume of the extracted sound signal;

setting a threshold used to detect a peak position with reference to the calculated volume;

detecting positions of a plurality of ones, higher than a predetermined threshold, of peaks of change in level of the extracted sound signal, the peaks of change in level being detected in accordance with the set threshold, the positions including at least one reference position;

detecting a time interval between the at least one reference position and one or more others of the detected positions in a predetermined unit-time interval;

identifying a frequently occurring one of the detected time intervals;

accumulating a frequency of occurrence of each time interval between the peak positions detected in a plurality of the unit-time intervals;

when a frequency of occurrence for a time interval exceeds a value, reducing a frequency of occurrence for at least one time interval;

identifying the tempo of the sound to be reproduced on a basis of a maximum one among all the accumulated frequencies of time interval occurrence; and displaying an image on an image display device corresponding to the identified tempo and not to a tempo identified using any autocorrelation calculation or beat structure analysis.

8. The method according to claim 7, wherein:

the extracting step comprises extracting a sound signal in a plurality of frequency bands from the input sound signal;

the detecting positions step comprises detecting the peak position for one or more of the divided frequency bands;

the detecting a time interval step comprises detecting the time interval between at least one reference position and one or more others of the positions in each of the one or more frequency bands; and the identifying step comprises identifying the tempo of the sound to be reproduced on the basis of the frequently occurring one of the time intervals detected in each of the one or more frequency bands.

9. The method according to claim 8, further comprising the steps of:

calculating volumes of sound signals of frequencies included in one or more of the plurality of extracted frequency bands; and setting a threshold used to detect a peak position with reference to the calculated volume.

10. The method according to claim 7, further comprising the steps of:

selectively reading video data from a plurality of video data stored in a storage means on the basis of the identified tempo; and displaying the image corresponding to the read video data on an image display device.

11. The method according to claim 10, further comprising the step of:

controlling size, moving speed and moving pattern of the image to be displayed on the image display device on a basis of the identified tempo.

12. The method according to claim 10, further comprising the step of:

selectively reading a plurality of video data stored in the storage means on the basis of the identified tempo and calculated sound volume.

* * * * *